United States Patent Office 2,875,746
Patented Mar. 3, 1959

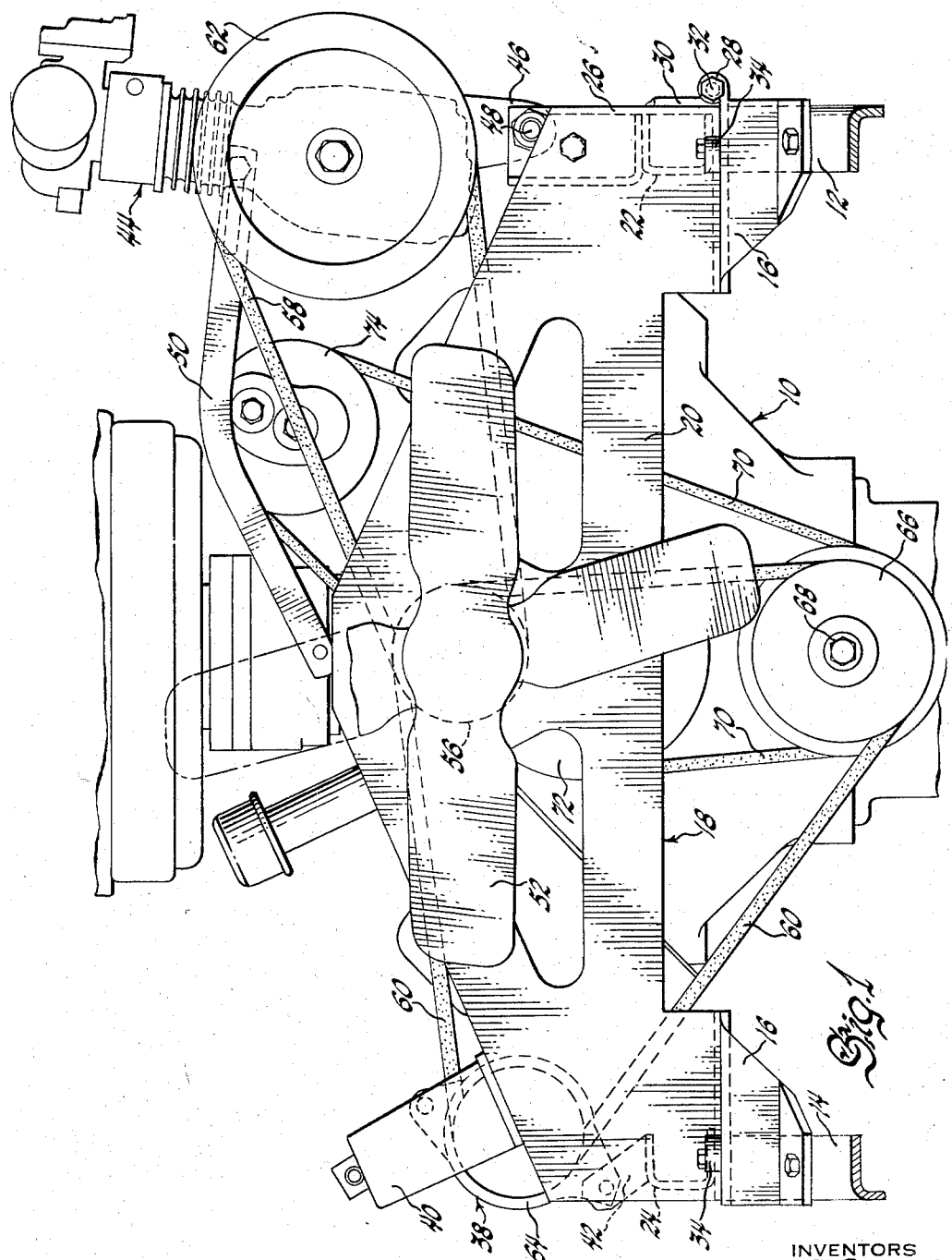

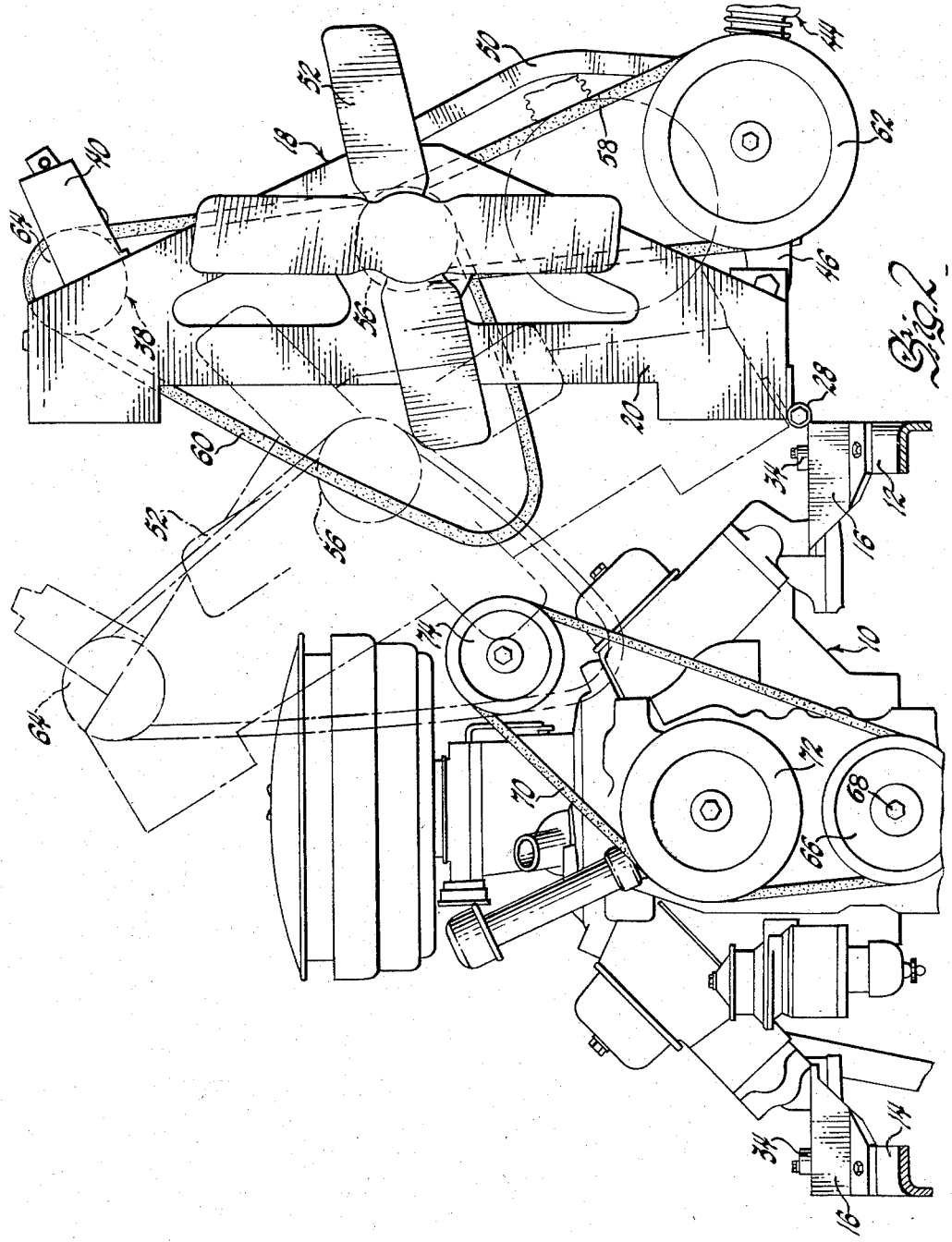

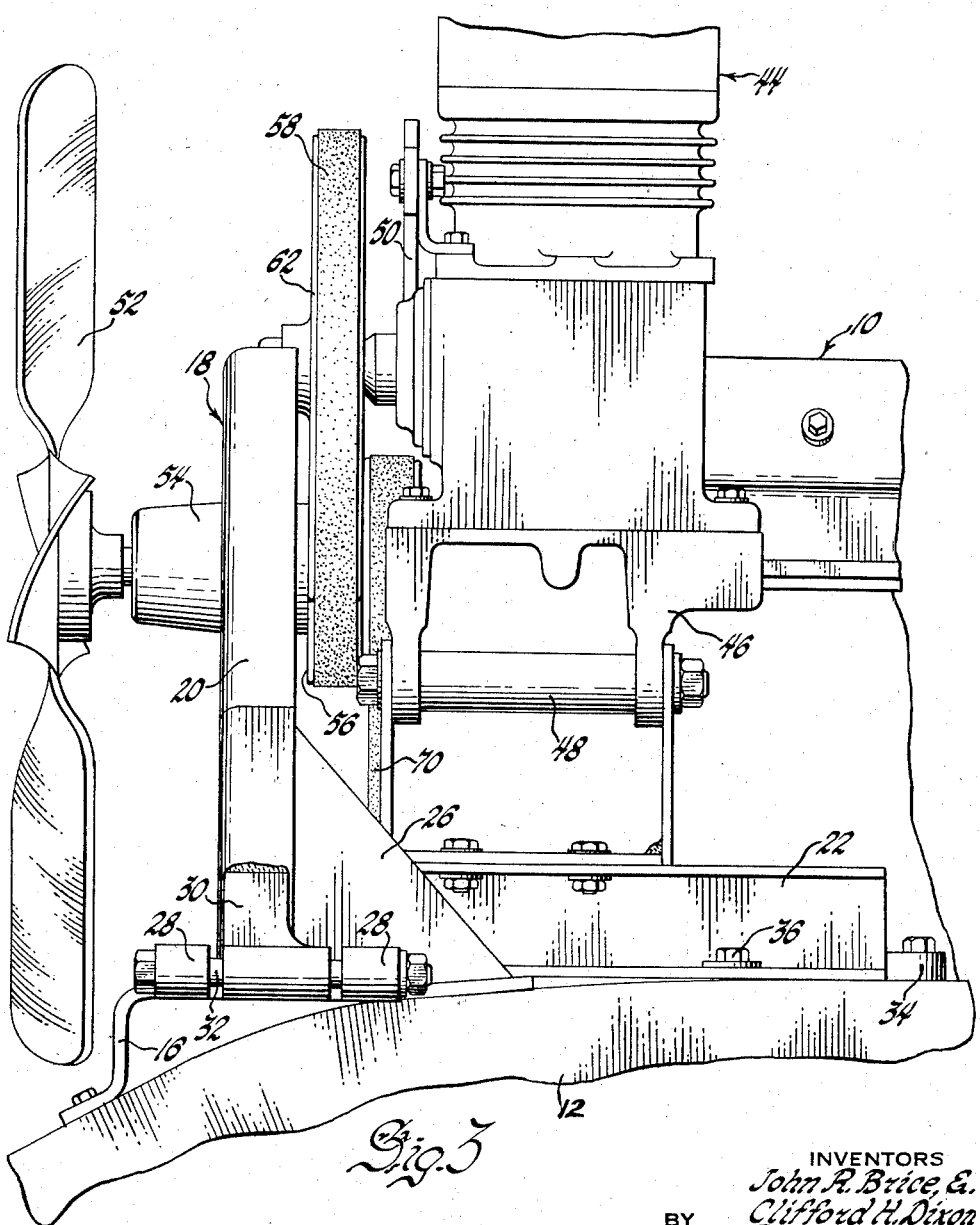

2,875,746

ENGINE ACCESSORY SUPPORT MEANS

John R. Brice, Pontiac, and Clifford H. Dixon, Franklin, Mich., assignors to General Motors Corporation, Detroit, Mich., a corporation of Delaware Application May 9, 1956, Serial No. 583,795

3 Claims. (Cl. 123—195)

This invention relates to means for mounting accessory drive units within an engine compartment in the most compact and least obstructing manner.

The increased demand for additional accessories on motor vehicles has resulted in numerous additional accessory drive units being housed within the vehicle engine compartment. The present number of accessory drive units already fills the engine compartment and makes access to the engine for even routine maintenance or minor repair a difficult and time-consuming job. Although it is customary to individually mount accessory drive units on pivotal or hinged brackets and to use belt drive means therewith, which may be more readily disconnected, the number of units and their different locations still requires considerable time in slacking off, removing and then in reverse order replacing and readjusting each unit separately.

It is here proposed to provide a single pivotal support member, upon which several accessory drive units may be mounted, and which is disposed for ready drive connection to the engine drive means. The support member may have the accessory drive units mounted thereon on individual pivotal mounts to enable separate drive adjustment on installation. The support member itself is hinge connected to one of the vehicle frame side rails which permits it to be pivoted completely out of the way to provide ready access to the front of the engine and the sides thereof, as the accesory drive units are swung out of the way with the support member. Means are provided for ready relocation of the support means in being returned so that no readjustment of the support of the accessories mounted thereon is necessary.

In the drawings:

Figure 1 is a front view of an engine including the accessory drive units mounted in accord with the present invention.

Figure 2 is a reduced front view of the engine and accessory drive units of Figure 1 showing the accessory support means pivoted out of the way to permit access to the engine.

Figure 3 is an enlarged side view of the proposed accessory mounting means showing the pivotal or hinged connection to one of the vehicle frame side rails.

The drawings disclose a vehicle engine 10 which is supported by and mounted between a pair of spaced vehicle frame side rails 12 and 14. Brackets 16 are secured to each frame side rail to support and position the accessory mounting means 18 which includes a flange strengthened support plate member 20 extending in front of the engine 10 and between the frame side rails 12 and 14.

The accessory supporting member 20 includes channel members 22 and 24 secured to each end thereof and extended rearwardly along side of the engine 10. These channel members rest upon the frame side rails 12 and 14 and serve as feet for the accessory mounting means. Gussets 26 secured to the channel members and support plate 18 provide added structural rigidity.

One of the brackets 16 is formed to include spaced hinge loops 28. A separate hinge loop bracket 30 is secured to the side of the support plate and the loop thereof is interposed between the other loops upon a hinge pin 32 to provide means pivotally fastening one side of the support plate 20 to one of the frame side rails. The hinge loop of bracket 30 will be noted to have room for adjustment on hinge pin 32 between the other hinge loops 28. This permits adjustment of the accessory supporting plate relative to the engine 10 to properly align the accessory drive means as will later be described. Once the proper adjustment has been made, and to preclude readjustment each time the accessory support plate 20 is pivoted out of its normally disposed position and returned, eccentric spacers or bushing members 34 are secured to the frame brackets 16 and side rails 12 and 14 at each end of the channel members 22 and 24. The accessory support member 20 is secured in position to the frame side rails by fastening means such as 36 extending through the flanges of the channel members and side rails.

The accessory mounting plate member 20 supports accessory drive units, such as a generator 38, secured thereto by generator supporting brackets 40 and 42, the latter being fastened to channel member 24; an air compressor unit 44, having a separately adjustable support base 46 which includes pivot pin 48 and is secured to the other channel member 22 of support means 20 with a support brace 50 extending to member 20; and an engine cooling fan 52 mounted centrally of plate 20. The cooling fan is journaled within a bearing member 54 and has a double sheave pulley 56 on the other end thereof. Drive belt 58 connects the fan pulley to the drive pulley 62 of the air compressor unit 44 and drive belt 60 connects the fan pulley to the drive pulley 64 of the generator 38. Drive belt 60 is also engaged with the double sheave pulley 66 secured to the end of the engine crankshaft 68. When belt 60 is removed from pulley 66 the accessory supporting member may be pivoted out of the way, as shown in Figure 2, to expose the front end of the engine 10.

The drive pulley 66 remains connected by belt means 70 to the engine water pump pulley 72 through an idler pulley 74. With the accessory support means hinged out of the way, as shown in Figure 2, the front end of the engine is adequately accessible for ready repairs. Only the accessory units have been placed out of service and the engine may still be operated, for a short period, since the water pump unit is still operable.

What is claimed is:

1. In combination, engine means and accessory drive mounting means for said engine means, said mounting means including a flange strengthened support plate having pivotal connecting means provided at one end thereof, means provided at the other end for temporarily retaining said support plate in secured relation relative to said engine means, a plurality of accessory drive units mounted upon said support plate and including means permitting separate adjustment of at least one of said units, drive belt means connecting said accessory units together, additional flexible drive means connecting said engine means to one of said accessory units, said additional drive means being readily disconnected from said engine means to permit the pivoted removal of said support plate and drive connected accessory units thereon away from said engine means, and preadjustable means for receiving the ends of said support plate therebetween and reorienting said support plate relative to said engine means upon the return thereof.

2. Accessory mounting means for use with a vehicle engine disposed and mounted between spaced frame rails, said mounting means including a pivotal support member disposed in front of the engine and having one end hinged to one of said frame rails and the other end thereof removably secured to the other of said frame rails, a plurality of accessory drive units mounted upon said support member, belt drive means connecting said accessory drive units together and to the engine, and means secured to said frame rails and engaging opposite sides of each of said ends of said support member for re-orienting said support member relative to engine drive means engaged by said accessory drive belt means following the relocation thereof between said frame rails.

3. Engine accessory support means which includes a pair of spaced frame rails having an engine mounted therebetween, a support plate including channel members secured thereto and extending rearwardly thereof along the sides of said engine and having means pivotally securing said plate and one of said channel members to one of said frame rails and means removably securing said plate and the other of said channel members to the other frame rail in front of said engine, individually adjustable accessory drive units secured to said channel members and including interconnecting accessory drive pulley means, other drive pulley means provided on said support plate and connected to said engine and accessory drive units, said support plate together with said channel members being pivotal about said one frame rail to remove said accessory drive units from in front of and to one side of said engine, and pre-adjustable means secured to said frame rails for repositioning said support plate and accessory drive units therewith upon the return thereof.

References Cited in the file of this patent

UNITED STATES PATENTS

| | | |
|---|---|---|
| 1,333,331 | Moses | Mar. 9, 1920 |
| 2,022,916 | Knapp | Dec. 3, 1935 |
| 2,095,058 | Cross | Oct. 5, 1937 |

FOREIGN PATENTS

| | | |
|---|---|---|
| 639,909 | Great Britain | July 5, 1950 |